United States Patent [19]

Brown

[11] Patent Number: 5,197,837
[45] Date of Patent: Mar. 30, 1993

[54] BROACH TOOL CHIP REMOVER

[75] Inventor: Paul C. Brown, Columbus, Ohio

[73] Assignee: General Electric Company, Cincinnati, Ohio

[21] Appl. No.: 840,216

[22] Filed: Feb. 24, 1992

[51] Int. Cl.⁵ .................. B23Q 11/00; B23D 39/00
[52] U.S. Cl. ........................ 409/249; 15/88.2
[58] Field of Search ............ 409/137, 249, 253; 15/88.2

[56] References Cited

U.S. PATENT DOCUMENTS

| | | | |
|---|---|---|---|
| 662,749 | 11/1900 | Arthur | 409/137 X |
| 1,507,771 | 9/1924 | Ferris | 409/249 |
| 1,647,499 | 11/1927 | Bly | 15/88 |
| 2,225,272 | 12/1940 | Horne | 15/4 |
| 2,619,009 | 11/1952 | Begle | 409/137 |
| 2,619,663 | 12/1952 | Johnson et al. | 15/88 |
| 3,916,469 | 11/1975 | Anthem et al. | 15/88 |
| 4,771,499 | 9/1988 | Fusi et al. | 15/88 |
| 5,036,568 | 8/1991 | Liebing | 15/256.6 |

FOREIGN PATENT DOCUMENTS

| | | | |
|---|---|---|---|
| 23984 | 2/1981 | European Pat. Off. | 409/137 |
| 35488 | 3/1979 | Japan | 409/249 |
| 884955 | 12/1981 | U.S.S.R. | 409/249 |
| 973305 | 11/1982 | U.S.S.R. | 409/249 |

*Primary Examiner*—William Briggs
*Attorney, Agent, or Firm*—Jerome C. Squillaro; Charles L. Moore, Jr.

[57] ABSTRACT

A cutter tool cleaning assembly comprises a pair of peripherally opposed wire brush wheels mounted on a metal cutting broach machine so that the machine cutter bar engages and passes between the wheels to cause rolling contact of the wheels with the cutter bar to dislodge metal chips.

11 Claims, 1 Drawing Sheet

5,197,837

BROACH TOOL CHIP REMOVER

BACKGROUND OF THE INVENTION

This invention relates to an improved broaching tool chip remover, and more particularly to a rolling brush cleaning assembly for removing metal chips from a broaching tool without a rubbing or scrubbing action of the brush and without power drive assistance to the brush assembly.

One example of a large machine mounted broaching tool comprises an elongated metal cutting bar of generally rectangular cross-section having a longitudinal row of spaced apart metal cutting tool projections projecting laterally from along a longitudinal edge of the bar. The bar is generally passed perpendicularly to a surface of a workpiece to cut or gouge a groove or slot therein with a peripheral shape comparable to the shape of the cutting tool projections. The size of the cutting tool projections on the bar vary progressively along the bar so that all or a part of the periphery of the slot being cut, is progressively increased in size to a final dimension correlated to the size of the largest cutting tool projections in the row. The cutter bar may also have its cutter tool projections extending upwardly from its horizontal plane, an arrangement similar to a gear rack, the cutter projections being represented by the gear teeth of the rack.

As the cutter bar passes along the workpiece to remove a layer of metal, a chip of the removed metal curls into the space between cutting tool projections. Ordinarily this curled chip will fall from between cutter projections when the cutter bar passes away from the workpiece. However, should these chips not fall from the cutter bar, they may accumulate between cutter projections to an extent which deleteriously interferes with the cutting action of the broach.

Among the more common reasons for failure of the metal curl chips to fall away from the cutter bar are (1) the curled chip becomes frictionally engaged or wedged in the space between spaced cutter projections, and (2) because of the high temperatures involved in metal cutting processes, cutting oils are used in large quantity to provide cooling as well as cutting efficiency. However, it is difficult for this oil to penetrate deep into the workpiece at the precise location of the metal cutting action with the result that the temperatures of the cutting tool projection edge and the curled chips are sufficient to cause a welding reaction which firmly attaches the chip to a cutter projection.

The foregoing description is indicative of a need for metal chip removal and particularly a need for auxiliary and positive means to remove wedged or joined metal curls from the cutter bar. Passing the bar through a steel wire brush in abrading or rubbing contact with the cutter projections to forcibly remove metal curls causes the cutter edges to cut off the wire bristles and rapidly lead to ineffectiveness of the rubbing brush procedure, particularly for smaller or thinner cutter bars which the cutter shortened bristles fail to reach. Power drive wire brushes have been employed to vigorously scrub a broach cutter bar to remove metal chips. Power driven brushes tend to cause undesirable wear on the broaching tool and are not readily adjustable for broaching tools of different thicknesses with the result that larger broaching tools tend to cut the wire bristles from the brush.

OBJECTS OF THE INVENTION

Accordingly, it is an object of this invention to provide an improved chip removal assembly for broaching machine cutter tools.

It is another object of this invention to provide an improved chip removal brush assembly for broaching machine cutter tools.

It is a further object of this invention to provide an improved wire brush assembly for chip removal from metal cutting broach machine tools.

It is yet another object of this invention to provide an improved non-abrasive wire brush assembly for chip removal from the metal cutter bar of broach machines.

It is still another object of this invention to provide a rotating non-rubbing wire brush assembly for removing metal chips from a broach cutter in metal cutting broach machines.

These and other objects of this invention will be better understood when taken in connection with the following description of the invention and its drawings.

DESCRIPTION OF PREFERRED EMBODIMENTS OF THE INVENTION

Figure 1:
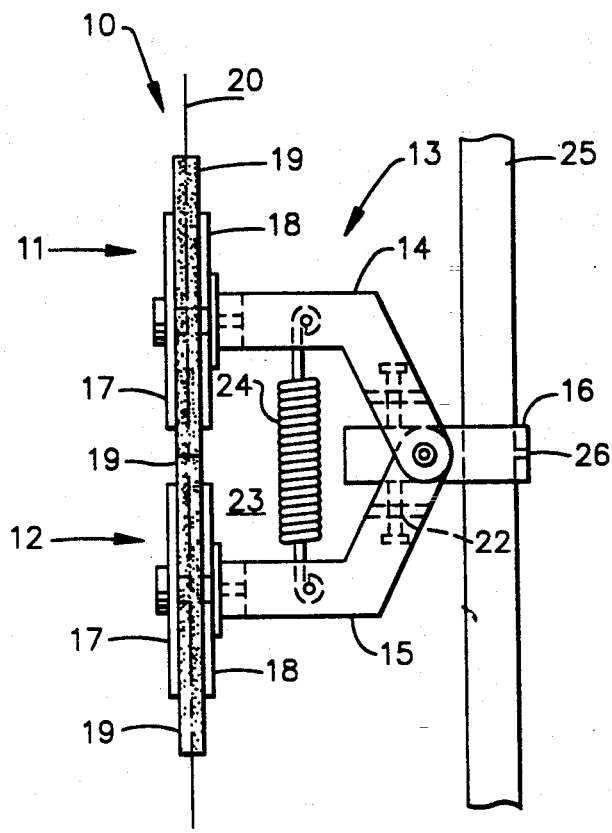
FIG. 1 is a schematic side elevational view of a rotating wire brush assembly of this invention.

Referring now to FIG. 1, metal chip removing brush assembly 10 comprises a pair of circular steel wire brush wheels 11 and 12 mounted for rotation in parallel, planar coincident and opposed peripheral spaced apart relationship on a support structure 13. In one form, support structure 13 comprises a pair of unidirectionally extending spaced apart angle arm or wheel mounts 14 and 15. Arms 14 and 15 are pivot mounted on or from a platform 16 so that wire brush wheels 11 and 12 may be moved towards and away from each other. As illustrated in FIG. 1, angle arms 14 and 15 are pivot mounted in opposed relationship to each other in a kind of mandibular joint which provides one leg of each arm angle in parallel and increased spaced relationship from its counter part leg of the other arm member. By this means, relatively large wire wheels may be mounted on the ends of the parallel arm members 14 and 15 without significant peripheral interference which would cause excessive planar tilting of one wheel with respect to the other, when ordinarily, wheels 11 and 12 are generally parallel and coincident with each other in the same plane. Wire brush wheels 11 and 12 each comprise a pair of parallel spaced apart discs 17 and 18 which retain therebetween a circular array of radially extending steel wire bristles 19. The steel wire bristle may be bound together as a continuous and contiguous circular array or an array of smaller bundles of bristles. As illustrated, support assembly 13 supports the wire brush wheels 11 and 12 in coplanar and coincident relationship to each other as indicated by centerline 20. In addition to the described relationship, it is an important feature of this invention that wheels 11 and 12 do not include any drive means for their rotation and are mounted to be freely rotatable bidirectionally, i.e. clockwise or counterclockwise.

Since wire brush wheel spacing may differ for different applications of assembly 10, adjustment or stop means are provided for the pivoting action of arms 14 and 15. As illustrated in FIG. 1, adjusting screws 21 and 22 pass through an appropriate structure part of arms 14 and 15 to bear against common support 16 and pivot an arm and its wheel towards or away from its opposite arm and wheel. In connection with differing applications of assembly 10, arm members 14 and 15, as described, are suitably angled to provide an increased spaced apart dimension or space 23 therebetween to accommodate wire brush wheels of larger diameters. Space 23 is also expedient for locating a biasing means, for example, a constant tension spring 24 to extend between and engage arms 14 and 15 to bias them in a direction towards each other.

The supporting structure 13 for wheels 11 and 12 also includes a machine mounting assembly including a shaft or rod 25. Platform 16 includes an aperture therethrough through which rod 25 extends in axial sliding relationship. A set screw means 26 in platform 16 bears against rod 25 to fix the linear position of platform 16 along rod 25. Suitable clamping or attaching devices are utilized to mount rod 25 and its support structure 13 to its operational equipment such as a metal cutting machine in which assembly 10 is useful as a metal chip removal component.

Assembly 10 is advantageously attached to a broaching machine wherein an elongated linear broach cutter bar is moved axially along a workpiece to progressively cut a slot or groove therein. For example, such a broaching machine may cut a blade mounting slot such as a modified V section in the rim periphery of a hot gas turbine engine compressor or turbine wheel disc. A schematic representation of a broaching operation as described is illustrated in FIG. 2.

Figure 2:
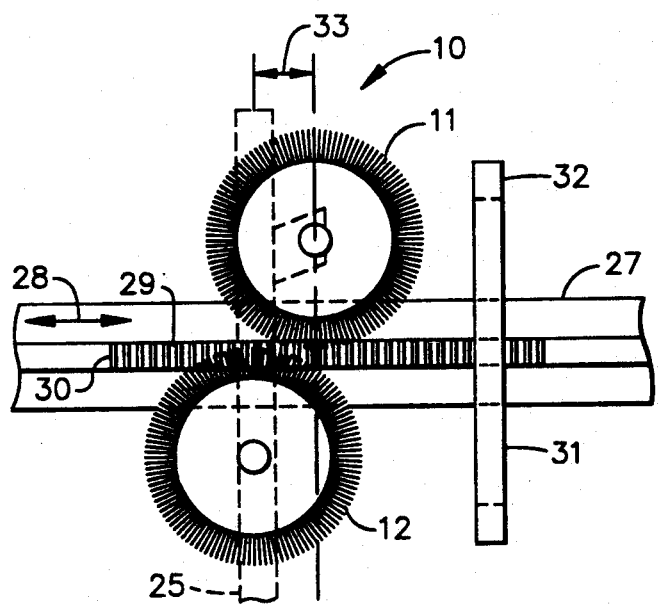
FIG. 2 is a frontal elevational view of the rotating brush chip removal assembly of this invention mounted in operative relationship with a broach cutter bar.

Referring now to FIG. 2, broach rail 27 which is ordinarily a part of a broaching machine and is caused to move linearly along its longitudinal axis in a controlled reciprocating motion as illustrated by arrow 28. Attached to rail 27 and projecting therefrom is a broach cutter bar 29 having a row of spaced apart cutter projections 30. Mounted adjacent broach rail 27 is a disc workpiece 31. Workpiece 31 may be a turbine or compressor wheel disc of a hot gas turbine engine in which a circumferential row of radial slot openings 32 are provided to receive airfoil bucket or blade roots therein. Disc 31 is appropriately mounted on a broaching machine with its plane perpendicular to the broach cutter bar 29 so that its periphery will interfere with passage of the broach cutter bar to cause cutters 30 to progressively cut the disc periphery to form blade slots 32. After passage of the cutter bar 29 past disc 31 and its return to its start position, disc 31 is appropriately rotatably indexed for metal removal or cutting of the next slot.

One operation of this invention is also described with respect to FIG. 2.

Referring to FIG. 2 where platform 16 has been removed for purposes of clarity, assembly 10 is mounted adjacent workpiece or disc 31 on its support rod 25 (shown in phantom line) in a manner such that cutter bar 29 engages and passes between wire wheels 11 and 12 for chip removal, particularly as the cutter bar passes away from disc 31. This engaging action is the only action utilized to rotate wheels 11 and 12. No accessory power devices are employed for wire wheel rotation, and consequently wheels 11 and 12 roll on opposite sides of cutter bar 29 without significant rubbing or scrubbing action. The spaced apart dimension of wheels 11 and 12 is adjusted to provide some interference with the traveling cutter bar not only to assure rotation and rolling action, but also to cause the wire bristles to penetrate into the open spaces between cutter projection as illustrated in FIG. 2. Ordinarily, each wheel 11 and 12 will have its bristles penetrating about one half the thickness of the cutter bar or its cutter projections so that the root area between cutter projections is cleaned of metal curls. It is advantageous to use an assembly 10 on each side of disc 31 so that chip removal may occur in each direction of reciprocating motion of broach rail 27 and to effectively limit the extent of necessary travel of cutter bar 29 on the back stroke of the machine. Specifically machine rail 27 and cutter bar 29 are programmed to accomplish a metal cut in one direction of the reciprocating motion, the forward stroke, and then to retract to its starting position, the back stroke, for disc adjustment or indexing and a further cutting or forward stroke.

Operation and chip removal from a broach cutter is also further described with respect to FIG. 2.

Referring again to FIG. 2, assembly 10 of FIG. 1 is illustrated as mounted on a broaching machine so that broach cutter bar 29 passes between wire brush wheels 11 and 12. The passing cutter bar engages the wire mass of wheels 11 and 12 causing them to simultaneously and oppositely rotate and roll on cutter bar 29 with the wire bristles of wheels 11 and 12 projecting into the spaces between cutter elements on bar 29 to dislodge metal curl chips. No external power is applied to rotate wire brush wheels 11 and 12 and no scrubbing or rubbing action is generated. It is the contact rolling motion and brush penetration into bar 29 which are effective in chip removal. Since the wire wheels are free to rotate there is no undue stiffness in the system which would enhance cutting of the wire bristles by the cutter bar. The rolling action of the wire bristles on the cutter bar together with biasing force from spring 24 (FIG. 1) are effective to dislodge curls which are welded to the cutter bar as described, without any rubbing motion. It is an advantageous feature of this invention that the rolling engagement of the spring biased self adjusting wheels permits the chip removal action to automatically follow the cutter bar and cutter contours for continuous cleaning. This effective cleaning takes place without excessive frictional wear and deterioration of the wire bristles as occurs with separate power operated brushes. It has also been found that better chip removal results are achieved when the vertical, as illustrated in FIG. 2, center lines of wheels 11 and 12 are not coincident and one wheel is offset with respect to the other wheel along the cutter bar. For example, in FIG. 2, upper brush 11 is offset in the forward or stroke direction as compared to the lower brush 12 by a distance 33 between wheel centerlines.

With respect to FIGS. 1 and 2, cutter bar 29 is in or parallel to the plane of the brush wheels which it peripherally engages. There is no predetermined angularity or skewering of the brush wheel and cutter bar planar relationship. Such a non-skewering relationship substantiates a positive rolling action with minimal lateral or abrading motion.

While this invention has been disclosed and described with respect to a preferred embodiment, it will be understood by those skilled in the art that various modifications and changes may be made without departing from the spirit and scope of the invention as set forth in the following claims.

What is claimed is:

1. An automatically self-adjusting metal cutter tool chip removal assembly comprising in combination,
   (a) a dual opposed wire brush wheel assembly,
   (b) a support structure for mounting said dual opposed wire brush wheels in said chip removal assembly in spaced apart opposed peripheral coplanar relationship for bi-directional free rotation and for movement towards and away from each other to change said spaced apart peripheral relationship,
   (c) biasing means biasing said wheels towards each other, and
   (d) a mounting assembly attached to said support structure for mounting said support structure adjacent a linearly moving metal cutter tool for said tool to pass between and engage said wire brush wheels for rolling contact of said brushes on said passing tool to remove metal chips from said tool, each of said dual opposed wire brush wheels having an axis of rotation substantially perpendicular to a direction of movement of said linearly moving cutter tool.

2. The invention as recited in claim 1 wherein said support structure comprises a pair of projecting pivotally mounted arm members on which said wheels are concentrically mounted in spaced apart periphery opposed coplanar relationship for free bidirectional rotation.

3. The invention as recited in claim 2 wherein spring biasing means is connected to said arm members to bias the arm members towards each other.

4. The invention as recited in claim 2 wherein said arm members are pivotally connected to said support structure.

5. In a broaching metal cutting machine having an elongated cutter bar with a row of metal cutter projections thereon and adapted for reciprocating motion adjacent a workpiece for metal removal therefrom, a chip removal assembly for said machine comprising in combination,
   (a) a support adapted for attachment to said machine,
   (b) a pair of arm members pivotally attached to said support to project therefrom in spaced parallel relationship,
   (c) a pair of wire brush wheels mounted on said arms in opposed spaced apart peripheral relationship to define a space therebetween in which said cutter bar may axially pass, each of said pair of wire brush wheels having an axis of rotation substantially perpendicular to the reciprocating motion of the cutter bar, and
   (d) spring means biasing said opposed wheels into opposite engagement with said cutter bar so that the axial passing of said cutter bar engages said wheels for rolling contact of said wheels on said cutter for chip removal.

6. The invention as recited in claim 5 wherein said defined space causes the wire brush of said wheels to penetrate between said metal cutter projections.

7. The invention as recited in claim 5 wherein said wire brush wheels are positioned parallel and coincident with each other and in the same plane.

8. The invention as recited in claim 5 wherein adjustable stop means on said arms provide a limit to said opposite engagement.

9. The invention as recited in claim 5 wherein said arm members comprise angle arms mounted on a common pivot and extending so that their angle configuration provides an increased space therebetween for said wheels to fit thereon without peripheral interference.

10. The invention as recited in claim 7 wherein said arms are out of coincidence with each other to offset said wheels from each other along said cutter bar.

11. In a broaching metal cutting machine having an elongated cutter bar with a row of metal cutter projections thereon and adapted for reciprocating motion adjacent a workpiece for metal removal therefrom, a chip removal assembly for said machine comprising in combination,
   (a) a support adapted for attachment to said machine,
   (b) a pair of arm members pivotally attached to said support to project therefrom in spaced parallel relationship,
   (c) a pair of wire brush wheels mounted on said arms in opposed spaced apart peripheral relationship to define a space therebetween in which said cutter bar may axially pass, said wheels being offset relative to each other along said cutter bar, and
   (d) spring means biasing said opposed wheels into opposite engagement with said cutter bar so that the axial passing of said cutter bar engages said wheels for rolling contact of said wheels on said cutter for chip removal.

* * * * *